March 28, 1967 J. R. COX 3,311,383
EXPANDABLE MANDREL
Filed Jan. 28, 1965
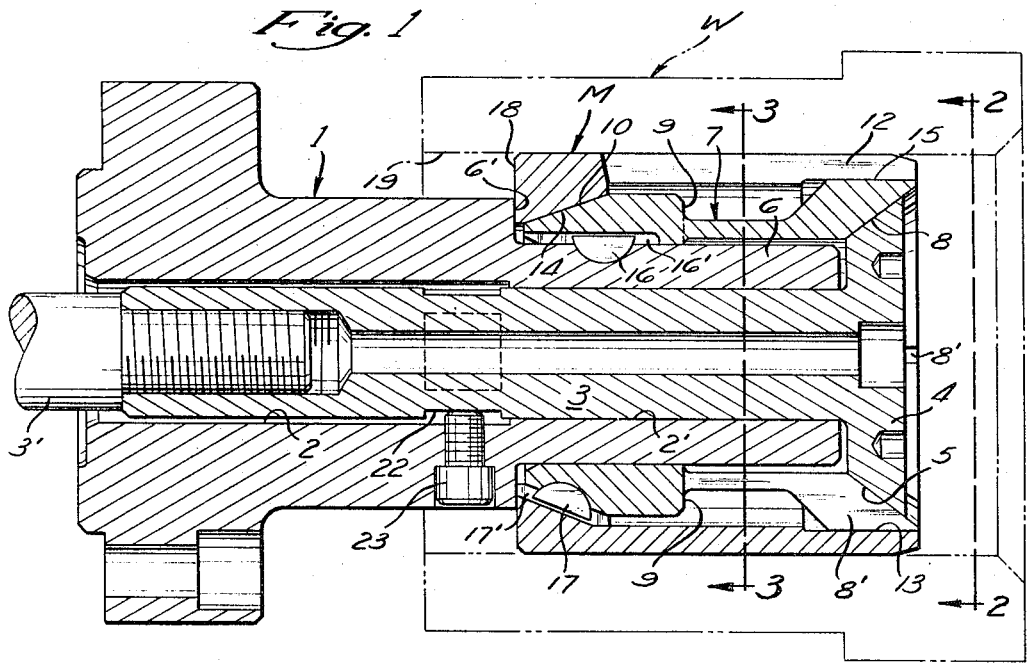
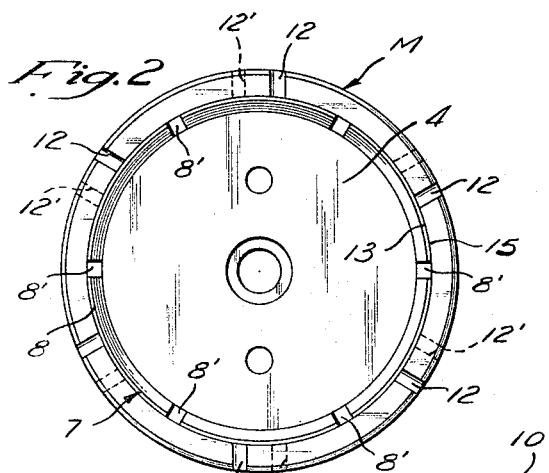
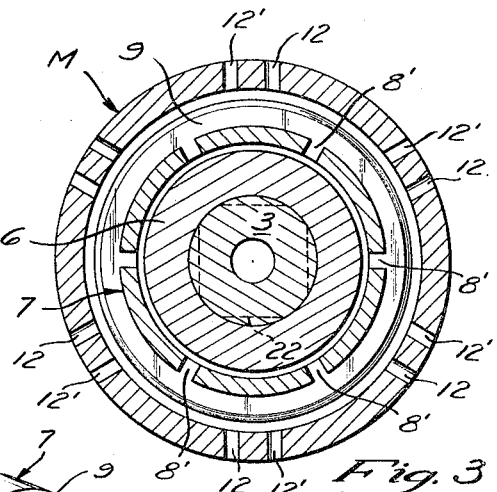
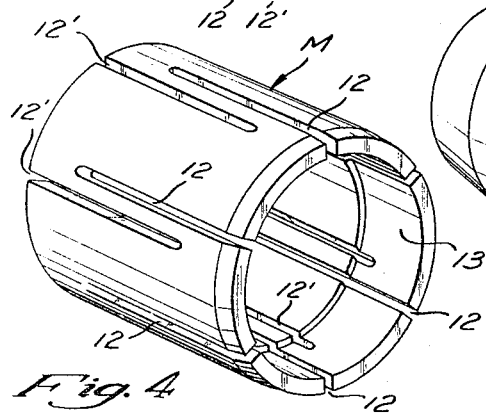
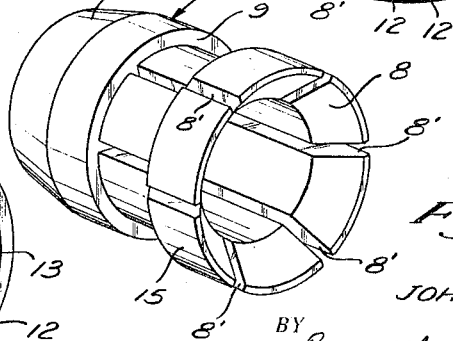
INVENTOR.
JOHN R. COX
BY Bosworth, Sessions
Herrstrom + Knowles
ATTORNEYS

United States Patent Office 3,311,383
Patented Mar. 28, 1967

3,311,383
EXPANDABLE MANDREL
John R. Cox, Lakewood, Ohio, assignor to Balas Collet
  Manufacturing Co., Cleveland, Ohio, a corporation of
  Ohio
Filed Jan. 28, 1965, Ser. No. 428,796
12 Claims. (Cl. 279—2)

This invention relates to releasable work gripping devices and more particularly to an improved mandrel for securing a work piece in position on the spindle of a lathe, screw machine or the like.

Expandable mandrel devices for holding work pieces during a turning or other machining operation are very old. A commonly used design employs a resiliently expandable mandrel having an inclined bore at one or both ends together with means for effecting relative movement between the mandrel and a corresponding face on or carried by the spindle of the machine in order that the resilient mandrel may be radially expanded into gripping engagement with a bore in the work piece which is supported thereon. Axial movement of such a mandrel is required to effect the desired expansion thereof. Such axial movement of the mandrel will carry the work piece with it and, unless the work piece and the spindle are provided with engaging stops or abutments, the work will be moved in an axial direction during expansion of the mandrel into work holding position. This movement of the work is very undesirable because it prevents accurate locating of the work on the spindle, thus interfering with the accuracy of subsequent machining operations.

It is an object of the present invention to provide an expanding mandrel mechanism for holding work pieces during machining operations whereby the work piece may be placed in any desired position on the mandrel and the mandrel then expanded into work holding position without moving the work piece longitudinally and without the necessity for providing stop means between the work and the machine to prevent longitudinal movement of the work during the gripping operation.

The above and other objects of my invention will appear from the following description of one embodiment thereof, reference being had to the accompanying drawings in which:

FIGURE 1 is a vertical longitudinal cross-sectional view through the spindle of a machine tool equipped with one of my improved mandrels;

FIGURE 2 is an end elevation of the apparatus shown in FIGURE 1, taken substantially on line 2—2 of FIGURE 1;

FIGURE 3 is a vertical cross-sectional view taken substantially on line 3—3 of FIGURE 1;

FIGURE 4 is a detached perspective view illustrating the resilient expandable mandrel member; and FIGURE 5 is a detached perspective view illustrating the intermediate sleeve member of my mechanism.

Referring to FIGURE 1, the work support member or spindle of a machine tool is seen at 1. This spindle has a hollow bore 2 in its outer end portion 2' in which a draw rod 3 has a sliding fit. Axial movement of the draw rod 3 may be effected by any suitable and well-known actuating means such as an extension rod 3' projecting through the spindle of the machine tool to a hydraulic cylinder or the like (not shown). The outer (right hand) end of draw rod 3 is provided with an enlarged operating head 4 having a conical beveled or inclined face portion 5, the angle of which, as illustrated, is about 40° to the common longitudinal axis of the rod 3 and spindle 1.

Supported for limited axial sliding movement on the cylindrical outer end portion 6 of the spindle 1 is a generally cylindrical intermediate sleeve member 7. At the outer end of member 7 is an inner bore or recess having an inclined face portion 8 adapted to be engaged by and coact with the correspondingly beveled or inclined face portion 5 of the operating head 4. A plurality of circumferentially spaced slots 8' extend inwardly from the outer end of intermediate member 7 as far as the shoulder 9. These slots 8' are provided to permit resilient expansion and contraction of the outer end of the intermediate member 7 when the draw rod head 4 is moved axially relative to the sleeve member 7 and its inclined face 5 acts upon the correspondingly inclined face 8 of the sleeve member 7.

As is clearly seen in FIGURE 5, the slots 8' terminate short of the external inclined inner face 10 of the intermediate sleeve 7 and thus this sleeve, from the shoulder 9 to its inner end, is not radially expandable. The tapered or inclined conical non-expandable face portion 10 is formed at the inner end of sleeve member 7 and, as illustrated in the drawings, the angle of inclination of this face is about 20° to the common longitudinal axis of the spindle and sleeve member. It will be noted that the face portion 8 and the face portion 10 of the sleeve member 7 are inclined in the same direction relative to the axis of the sleeve member. The inner end portion of the sleeve member 7 has a sliding fit on the end portion 6 of the spindle 1 and is adapted to have axial movement thereon, being limited in its maximum movement to the left by engagement with the shoulder 6' on the spindle 1 as is best seen in FIGURE 1.

The work gripping resiliently expandable mandrel member is generally indicated at M in the drawings. In order to provide the resilient construction required to permit expansion and contraction of this mandrel throughout its entire length it is provided with slots 12 and 12' which extend respectively inwardly from the outer and inner ends of the mandrel in overlapping relation. These slots are preferably arranged in adjacent pairs as clearly seen in FIGURE 4 and as is disclosed in the John R. Cox United States Patent No. 2,996,301.

The inner (left hand) end of mandrel M is formed with a conical bore 14 the face of which is inclined at the same angle as the face 10 of the intermediate member 7 and is disposed to be engaged thereby. The bore 13 of mandrel M at its outer (right hand) end is cylindrical in form and engages and has a sliding fit on the outer cylindrical surface 15 of the intermediate member 7.

In order to effect a driving connection between the spindle 1 and the intermediate sleeve member 7 a key 16 is mounted in the spindle and extends into a longitudinally extending slot or key-way 16' in the inner bore of intermediate member 7. The slot 16' permits longitudinal movement of the intermediate member 7 on the spindle 1 while a positive driving connection therebetween is maintained. In like manner, in order to provide a driving connection between the intermediate member 7 and the mandrel M while permitting relative longitudinal movement thereof, a key 17 is mounted in the tapered end portion 10 of member 7 and extends into a slot or key-way 17' formed in the conical bore 14 of the mandrel M. The draw rod 3 has a flattened portion 22 formed thereon and a screw 23 extends through spindle 1 with its inner end adjacent the flat 22 so that relative rotation of spindle 1 and draw rod 3 is prevented while longitudinal movement of the rod in the spindle is permitted.

When the parts are assembled in their operating positions, as seen in FIGURE 1, the inner end 18 of the mandrel M engages the shoulder 6' on the spindle 1 which forms a stop means preventing axial movement of the mandrel M to the left on spindle 1. For purposes of this description it may be assumed that, as seen in FIGURE 1, the mandrel device has been expanded into gripping position in the tubular bore 19 of the work piece illustrated in phantom lines at W. To release the device from its expanded work gripping position the draw rod 3 and operating head 4 are moved slightly to the right. This permits the slotted right hand end portion of the intermediate sleeve member 7 to contract thus releasing the expanding pressure exerted thereby on the right hand end of the mandrel M. At the same time the inherent resiliency of the released mandrel M will cause it to contract correspondingly and during its contraction its left hand portion will, because of the engagement of the inclined faces 14 and 10, move the intermediate member 7 slightly to the right.

The mandrel M will now be in its normal released or unexpanded condition in which its outside diameter is slightly smaller than the bore 19 in the work piece W which may now be removed. When the next work piece W is moved over the mandrel M it may be located longitudinally of the spindle 1 in any desired position. To grip the work the draw rod 3 is moved to the left. The first result of this movement will be to cause the conical face 5 of the head 4 to engage the corresponding conical face 8 of the intermediate member 7 and to move the intermediate member 7 bodily to the left causing the inclined face 10 thereof to engage the corresponding inclined bore 14 of the mandrel M and expand the inner end portion of the mandrel M radially outwardly into gripping engagement with the work piece W. Movement of the mandrel M to the left during this step is positively prevented by its engagement with the flange 6' on the spindle 1.

After the inner portion of mandrel M has thus been expanded into gripping engagement with the bore 19 of the work piece W further movement of the intermediate member 7 to the left is prevented because the mandrel M cannot expand further to permit such movement. However, limited further movement to the left of the draw rod 3 and the inclined face 5 of the head 4 may occur and will cause the longitudinally slotted outer portion of the intermediate member 7 to expand because of the coaction of the inclined faces 5 and 8. This expansion of the cylindrical outer face of intermediate member 7 will cause corresponding expansion of the outer end portion of the mandrel M and the work piece W will now be firmly gripped along the entire outer surface of the mandrel M.

Because, as previously described, the angle of inclination of face 10 of intermediate member 7 and bore 14 of mandrel M is relatively small compared to the angle of inclination of the coacting faces 5 and 8 of the member 7 and the actuating head 4, the initial movement of the draw bar 3 and head 4 in work gripping direction (to the left in FIGURE 1) will first be effective to expand the inner (left hand) end of the mandrel M. When this expansion of the inner end of mandrel M is stopped by gripping engagement of the outer surface of the mandrel with the bore of the work piece W further movement of the draw bar 3 to the left will be effective to cause the outer (right hand) end of the intermediate member 7 to increase in diameter and to expand the right hand end of mandrel M into gripping engagement with the work piece W.

As previously explained, to release the mandrel it is only necessary to move the draw bar 3 and head 4 to the right whereupon the inherent resiliency of the mandrel M and of the split right hand end portion of the intermediate member 7 will effect release of the mandrel so that the work piece may be removed.

It will be apparent from the above description that with my improved mechanism no longitudinal (axial) movement of the mandrel M will occur during the expansion thereof into gripping relation with the work piece. Therefore there can be no shifting of the position of the work piece on the spindle 1 during the gripping action of the mandrel. Furthermore, while a work piece W is being slid into position over the contracted mandrel M it cannot, due to frictional contact with the mandrel, move the mandrel and cause it to expand and interfere with proper positioning of the work piece. Such undesired movement and expansion of the mandrel during loading of a work piece thereon is a common occurrence with previously proposed expanding mandrel devices.

It will be understood that, although I have described the illustrated embodiment of my expanding mandrel in considerable detail, modifications and variations may be made in the form, proportions, and arrangements of the parts without departing from the spirit of my invention. I do not therefore, wish to be limited to the exact mechanism herein shown and described but claim as my invention all embodiments thereof coming within the scope of the appended claims.

I claim:

1. A releasable work gripping device including a work support member, an intermediate sleeve member slidably supported on said work support member, an expandable mandrel supported on said intermediate sleeve member, said intermediate sleeve member having an external inclined face portion adjacent its inner end and an expandable outer end portion formed with a bore having an inclined face, said mandrel having a bore at its inner end inclined at the same angle as said inclined face portion at the inner end of said intermediate sleeve member and disposed to be engaged thereby, the outer end portion of said mandrel being supported on said expandable outer end portion of said intermediate sleeve member, and an operating head supported for axial movement relative to said work support member and having a face portion inclined at the same angle as, and disposed to engage, said inclined face of said bore in the outer end portion of said intermediate sleeve member.

2. A releasable work gripping device as defined in claim 1 in which said work support member has a cylindrical outer end portion and said intermediate sleeve member is generally cylindrical and slidably supported on said cylindrical portion of said work support member.

3. A releasable work gripping device as defined in claim 1 in which stop means are provided on said work support member disposed to engage said mandrel and limit axial movement thereof in one direction.

4. A releasable work gripping device as defined in claim 1 in which said inclined face portion adjacent the inner end of said intermediate sleeve member is non-expandable.

5. A releasable work gripping device as defined in claim 1 in which the expandable outer end portion of said intermediate sleeve member has a cylindrical outer surface on which the outer end portion of said mandrel is supported.

6. A releasable work gripping device as defined in claim 1 in which the angle of inclination of the external inclined face portion at the inner end of said intermediate sleeve member and of said bore at the inner end of said mandrel is smaller than the angle of inclination of said inclined face of the bore in the expandable outer end portion of said intermediate sleeve member and of said inclined face portion of said operating head.

7. A releasable work gripping device as defined in claim 1 in which said operating head is supported on a longitudinal draw rod extending through said work support member.

8. A releasable work gripping device as defined in claim 1 in which said expandable mandrel is expadanble throughout its length.

9. A releasable work gripping device as defined in claim 1 in which said expadable outer end portion of said intermediate sleeve member has a plurality of circumferentially spaced slots extending longitudinally inwardly from its outer end and terminating short of said external inclined face portion at the inner end of said sleeve member.

10. A releasable work gripping device as defined in claim 9 in which said expandable mandrel has a plurality of circumferentially spaced slots extending longitudinally inwardly from each end thereof in overlapping relation whereby said mandrel is expandable throughout its length.

11. A releasable work gripping device as defined in claim 1 in which the external inclined face portion adjacent the inner end of said intermediate sleeve member and said inclined face of said bore at the outer end of said intermediate sleeve member are inclined in the same direction.

12. A releasable work gripping device including, a work support member having a cylindrical end portion, an intermediate cylindrical sleeve member slidably supported on said cylindrical end portion of said work support member, a mandrel resiliently expandable throughout its length and supported on said intermediate sleeve member, stop means on said work support member disposed to engage said mandrel and limit axial movement thereof in one direction, said intermediate sleeve member having a non-expandable inclined external face adjacent its inner end and having a resiliently expandable outer end portion formed with a cylindrical outer surface and an inner bore having a face inclined in the same direction as but at a greater angle than said non-expandable external inclined face, said mandrel having a bore at its inner end inclined at the same angle at said non-expandable inclined face at the inner end of said intermediate sleeve member and disposed to be engaged thereby, the outer end portion of said mandrel being supported on said cylindrical outer surface of the expandable outer end portion of said intermediate sleeve member, and an operating member supported for axial movement relative to said work support member and having a face portion inclined at the same angle as, and disposed to engage, said inclined face of said inner bore of said intermediate sleeve member.

References Cited by the Examiner

UNITED STATES PATENTS

| 1,944,255 | 1/1934 | McFall | 279—2 |
| 2,935,329 | 5/1960 | Hessler | 279—2 X |

FOREIGN PATENTS

| 667,886 | 7/1963 | Canada. |

ROBERT C. RIORDON, *Primary Examiner.*

E. A. CARPENTER, *Assistant Examiner.*